F. C. MEYER.
ENGRAVING MACHINE.
No. 28,040. Patented Apr. 24, 1860.
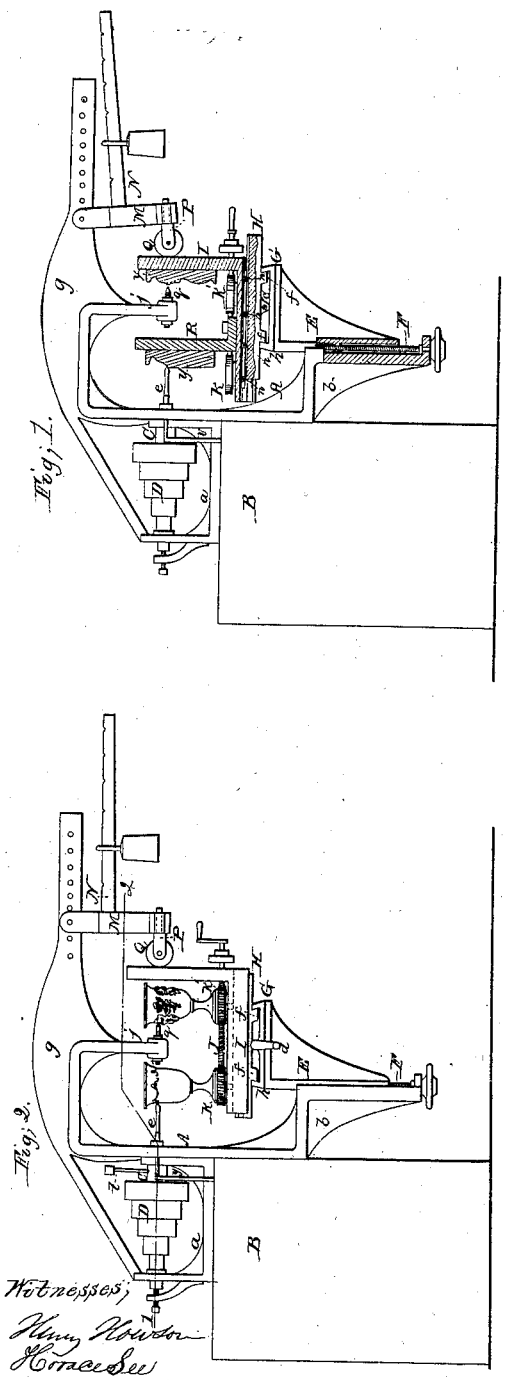
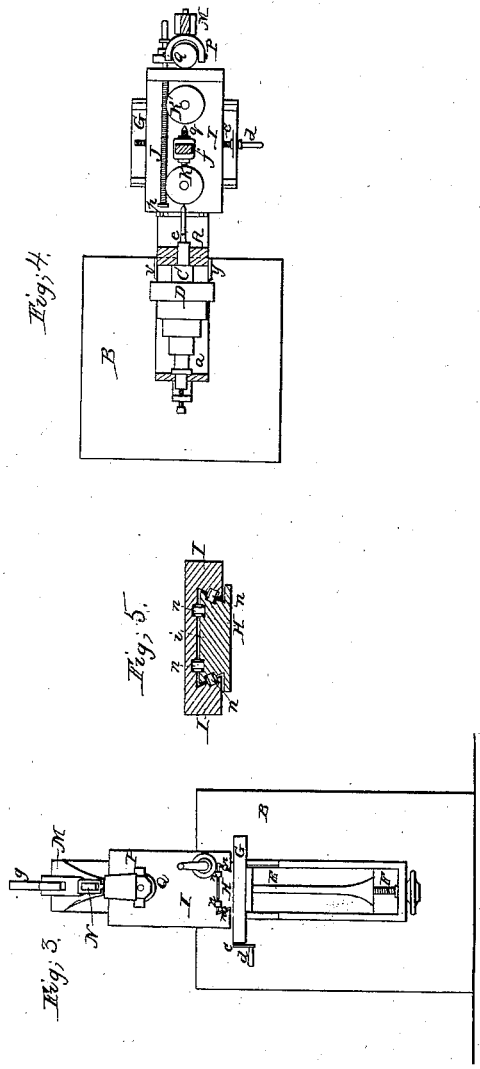
Witnesses:
Inventor:
Frederick C. Meyer

UNITED STATES PATENT OFFICE.

FREDERICK C. MEYER, OF PHILADELPHIA, PENNSYLVANIA, ASSIGNOR TO ERNESTINA MEYER, OF SAME PLACE.

MACHINE FOR COPYING FIGURES, &c.

Specification of Letters Patent No. 28,040, dated April 24, 1860.

*To all whom it may concern:*

Be it known that I, FREDERICK CHRISTIAN MEYER, of the city and county of Philadelphia and State of Pennsylvania, have invented certain new and useful Improvements in Machinery for Copying Ornamental Figures and Forms; and I do hereby declare the following to be a full, clear, and exact description of the same, reference being had to the accompanying drawing and to the letters of reference marked thereon.

My invention relates to improvements in that class of copying machines in which a revolving cutter is used to impart to a crude object the shape and ornaments of a given pattern, and my improvements consist, firstly, in forming on a block or plate of steel, or other material a facsimile of a given pattern, by attaching both block and pattern to a movable table in such a position in respect to a revolving drill or cutter, and a stationary tracer, imparting to the table such a continuous pressure toward the points of the tracer and the drill, and connecting the table to such a system of slides by which it may be readily moved vertically and transversely that the drill will remove from the crude block the exact amount of material and at the proper points regulated by the pattern as more fully described hereafter; secondly, so constructing the above mentioned tracer and so connecting it to the stationary frame that it may be readily adjusted longitudinally in respect to the point of the drill and in a line central with the center of the drill's rotation so as to compensate for any variation in the length of the drill caused by the breaking and removal, or sharpening of the same; thirdly, my invention consists of certain circular plates arranged to turn simultaneously on the above mentioned table and combined with the revolving drill and stationary tracer in the manner described hereafter so that my machine may be applied to the copying of ornamental figures and forms on circular objects; fourthly, in the peculiar application of certain anti-friction rollers to the above mentioned table and the slide on which it moves whereby the movement of the said table may be easy and uniform and effected by a very slight pressure, so that the most delicate and minute portions of the pattern may be transferred to the copy.

In order to enable others to make and use my invention, I will now proceed to describe its construction and operation.

On reference to the accompanying drawing which forms a part of this specification, Figure 1, is a side view (partially in section) of my improved machine as adapted to the cutting of ornamental forms on an object with a flat surface; Fig. 2, the same applied to the cutting of ornamental forms on circular surfaces; Fig. 3, an end view of the machine; Fig. 4, a sectional plan on the line 1—2 Fig. 1, and Fig. 5, a section of the table and slide, drawn to an enlarged scale.

Similar letters refer to similar parts throughout the several views.

(A) is the framework of the machine secured to any suitable bench or table (B). The portion (*a*) of the frame which rests on the bench is constructed after the manner of an ordinary headstock for a lathe and has a spindle (C) furnished with the usual cone pulley and adapted to receive the cutting tool or drill (*e*).

To the lower projecting portion (*b*) of the frame (A) is fitted a sliding table (E) in such a manner that it can have a vertical movement only, and this in a direction at right angles to the central line of rotation of the spindle (C), the vertical position of this table being controlled by the screw (F) in the manner best observed on reference to Fig. 1.

To the table (E) is secured a plate (G) furnished with a screw (*c*) having a suitable handle (*d*), the said screw being adapted to a nut on the under side of the slide (H) which has inclined projections (*f f*) adapted to inclined ribs on the plate (G) (as seen in Figs. 1 and 2) so that the slide which is controlled by the screw (*c*) can be moved horizontally in a transverse direction at right angles to the line of rotation of the spindle (C).

The slide (H) has a longitudinal dovetailed projection (*i*) of the same form as, but somewhat less than a longitudinal dovetailed recess in the table (I), the surfaces of the latter being maintained free from contact with those of the former at the top by the anti-friction rollers (*n n*) and at the inclined sides by similar anti-friction rollers, as best observed on reference to the enlarged sectional view Fig. 5, so that while the table (I) is capable of moving by the application of the slightest force in a line parallel with the center of rotation of the spindle (C) and at right angles to the direction in which the slide (H) moves, the table is prevented by the rollers from moving in any other direction.

(K) and (K') are two circular plates having spindles passing through and turning in the table (I), the edges of the plates being provided with teeth adapted to the threads of the screw (J) which turns at one end in the projection (p) of the table and at the opposite end in the vertical portion of the said table, the projecting portion of the screw being furnished with a suitable handle or with pulleys for receiving a strap.

The overhanging portion (g) of the frame has a projection (j) furnished with a tracer (q) the point of which is in a continuation of the center line of rotation of the spindle (C). This tracer consists of a screwed rod pointed at the end and furnished with two nuts one on each side of the frame through which the pin passes, so that by turning the nuts it may be adjusted longitudinally at pleasure.

On the outer end of the overhanging portion (g) of the frame are a number of holes to any of which an arm (M) may be connected, this arm being provided with a weighted lever (N) and at its lower end with a pin (P) having a rounded or spherical pulley (Q) which bears against the vertical portion of the table (I) the pin being so connected to the arm that it may turn freely therein.

Operation: Supposing my improved machine to be required for operating on a flat object as, for instance, a flat plate of steel which has to be formed into a die for stamping the ornamental work of silver or plated wares. The original pattern of the die may be produced in a variety of ways, one of the readiest plans being to mold it in wax or other plastic material and from this to take an electrotype or casting having a surface sufficiently hard to admit of its being used in connection with my machine. This pattern, represented at (x) (Fig. 1), is secured to the inside of the vertical portion of the table (I) which is situated between the roller (Q) of the arm (M) and the adjustable tracer (q). A vertical plate (R) is secured to the table (I) and to the inside of this plate is attached the block of steel or other metal (y,) from which the die has to be formed, the situation of the block in respect to the drill (e) being the same as that of the pattern in respect to the tracer (q). The weight on the lever (M) being adjusted so as to operate the slide (I) and cause the steel plate to be pressed against the drill (e) with the desired force, and the tracer being properly adjusted in the frame, a revolving motion is imparted to the spindle (C.) It will be seen that the table (I) as regards the extent of its movement toward the drill in a line parallel with the center of the shaft's rotation, is limited by the pattern (x) in conjunction with the tracer (q), so that as the table is moved vertically by turning the screw (F) or transversely by turning the screw (c) (Fig. 3) it will move from and toward the drill or cutter (e), from the latter, as the elevated portions of the pattern (x) are being passed over the tracer (q), and toward the cutter, as the lower portions of the pattern traverse in contact with the tracer. As the cutter revolves therefore, it must remove from the steel plate so much of the material that, when the whole surface of the plate has been brought in contact with the cutter the plate will be formed into a facsimile of the pattern and the desired die will be completed.

Owing to the delicate adjustment of the table on the anti-friction rollers which intervene between it and the slide (H), the most minute elevation or recess of the pattern will impart a corresponding movement to the table (I) the movement being easy and uniform and free from the sudden jerks which would be the result in the absence of the antifriction rollers. It will be seen that although the inward movement of the table is limited by the pattern (x) in conjunction with the roller, and the tracer (q) the pressure of the weighted arm is resisted by the point of the drill as it penetrates the steel plate and not by the tracer, the latter being in contact with the pattern only at such time as the cutter is imparting the finishing touches to the die at which time the greater part of the pressure is removed from the table so that the point of the latter may be made so sharp as to penetrate the most delicate interstices of the pattern without any fear of cutting or indenting its surface.

It is of importance that the stationary tracer should be made adjustable in the frame, as the cutter may break and require renewing or sharpening after the die or other object has been partially cut, the length of the drill is consequently altered in length to a greater or less extent and the position of the pattern would require alteration in the absence of any adjustability of the stationary scraper, which by means of the nuts may be moved to or from the pattern to suit the altered cutter.

The pattern may, in many cases, be of such a character that the finishing may be best imparted to the die by a scraping action, in this case a tool of the proper form is introduced into the end of the spindle (C) and the latter held stationary by its arm (t), resting on a rod (v) secured to the framework, when by operating the screw (F) the table with its plate and pattern may be moved up and down, or by operating the screw (c) may be moved transversely, in either case, the same scraping effect is produced the amount of the material removed from the plate by this scraping process and the points of the plate from whence it is removed, being regulated by the pattern and tracer.

Elaborate dies the preparation of which now requires the most tedious manipulation at the hands of skilled artisans may be produced with facility by the above described machine without any other aid than that required for operating the tables, and these may be made self-acting by a suitable system of gearing operated by the driving spindle (C) or any adjacent shaft.

When the machine is required for cutting ornamental forms on circular objects such as cups or other vessels, the vertical plate (R) is removed from the table (I) and a pattern cup secured to the circular plate (K') while to the plate (K) is secured the cup on the surface of which ornaments similar to those of the pattern cup have to be chased, as seen in Fig. 2.

It will be evident that the inward movement of the table (I) toward the revolving cutter is limited by the pattern on the cup and that by turning the two circular plates simultaneously by means of the screw (J) as the drill or cutter continues to revolve, figures or other ornaments the exact counterpart of those on the pattern cup will be formed on the surface of the cup on the circular plate (K.)

It will be seen without further description that by my improved machine the most elaborate ornaments may be transferred to cups, vases, and other circular objects of any material which can be operated on by a revolving drill or cutter that it may be applied to the copying of busts and other ornaments as well as to the formation of dies for embossing metal and leather or other substances. It will also be observed that the framework of the machine may be modified without any alteration in the effect produced by the operating parts of the machine, and that other appliances equally as efficient as the arm (M) and its weighted lever (N) may be used for applying a continued pressure to the table (I).

I am aware that a revolving cutter controlled by a pattern and a tracer has been heretofore used for transferring the shape of a pattern to an object acted upon by the drill. Therefore, I do not lay claim to the discovery of any new principle for producing copies of ornaments but I claim the within described machinery for accomplishing that end, that is to say,

I claim—

1. Forming an a block or plate of steel or other material a facsimile of a given pattern, by attaching both block and pattern to a movable table (I), in the within described position in respect to a revolving drill (e) and stationary tracer (q), imparting to the table a continuous pressure toward the drill or cutter by means of the weighted arm (M) and its roller (Q) or their equivalents, and connecting the table to such a system of slides that it can be moved vertically and transversely as herein set forth.

2. I claim so constructing the tracer (q) and so connecting it to the frame that it may be adjusted therein in respect to the point of the drill (e) and in a line with the center of the drill's rotation as and for the purpose herein set forth.

3. I claim the circular plates (K) and (K) arranged to turn simultaneously on the table (I) by operating the screw (J) the whole being combined with the revolving cutter or drill (e), the stationary tracer (q) and the weighted arm (M) or its equivalent as and for the purpose herein specified.

4. The anti-friction rollers (n n) when applied to the longitudinal dovetailed projection (i) of the slide (H) and the dovetailed recess of the table (I) substantially in the manner and for the purpose herein set forth.

In testimony whereof, I have signed my name to this specification in the presence of two subscribing witnesses.

FREDERICK C. MEYER.

Witnesses:
HENRY HOWSON,
CHARLES D. FREEMAN.